US 7,641,246 B2

(12) United States Patent
Ichikawa et al.

(10) Patent No.: US 7,641,246 B2
(45) Date of Patent: Jan. 5, 2010

(54) BUMPER BEAM STRUCTURE

(75) Inventors: Tomoaki Ichikawa, Wako (JP); Keiichi Honda, Wako (JP); Kojiro Okabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/143,356

(22) Filed: Jun. 20, 2008

(65) Prior Publication Data
US 2008/0315597 A1    Dec. 25, 2008

(30) Foreign Application Priority Data
Jun. 22, 2007    (JP)    ............... 2007-165199

(51) Int. Cl.
*B60R 19/02*    (2006.01)
(52) U.S. Cl. ..................................... 293/102
(58) Field of Classification Search ............... 293/102, 293/142, 143
See application file for complete search history.

(56) References Cited

U.S. PATENT DOCUMENTS

| 2,177,968 | A | * | 10/1939 | Weiss | ............... | 362/505 |
| 2,196,019 | A | * | 4/1940 | Lyon | ............... | 293/143 |
| 2,196,020 | A | * | 4/1940 | Lyon | ............... | 72/337 |
| 3,677,594 | A | * | 7/1972 | Gussack et al. | ............... | 293/143 |
| 5,277,465 | A | * | 1/1994 | Weir | ............... | 293/142 |
| 6,231,093 | B1 | * | 5/2001 | Storer | ............... | 293/115 |
| 6,318,773 | B2 | * | 11/2001 | Storer | ............... | 293/115 |

FOREIGN PATENT DOCUMENTS

| JP | 02254072 A | * | 10/1990 |
| JP | 07186848 A | * | 7/1995 |
| JP | 2002240747 A | * | 8/2002 |
| JP | 2003252134 A | * | 9/2003 |
| JP | 2005-271734 | | 10/2005 |
| JP | 2007261525 A | * | 10/2007 |

* cited by examiner

*Primary Examiner*—H Gutman
(74) *Attorney, Agent, or Firm*—Rankin, Hill & Clark LLP

(57) ABSTRACT

A bumper beam structure for a vehicle includes a height-raising wall provided on an upper portion of a beam body to be fixedly on left and right frames of a vehicle body. The height-raising wall includes: a bottom wall portion fixed to the upper portion of the beam body; a running-up preventing wall portion extending upwardly from the bottom wall portion; a first reinforcing wall portion connecting to the respective one end of the running-up preventing and bottom wall portions; and a second reinforcing wall portion connecting to the respective other ends of the running-up preventing and bottom wall portions. With such a height-raising wall, the bumper beam structure can interfere with another vehicle of a higher height to prevent the other vehicle from running up onto the vehicle provided with the bumper beam structure.

5 Claims, 5 Drawing Sheets

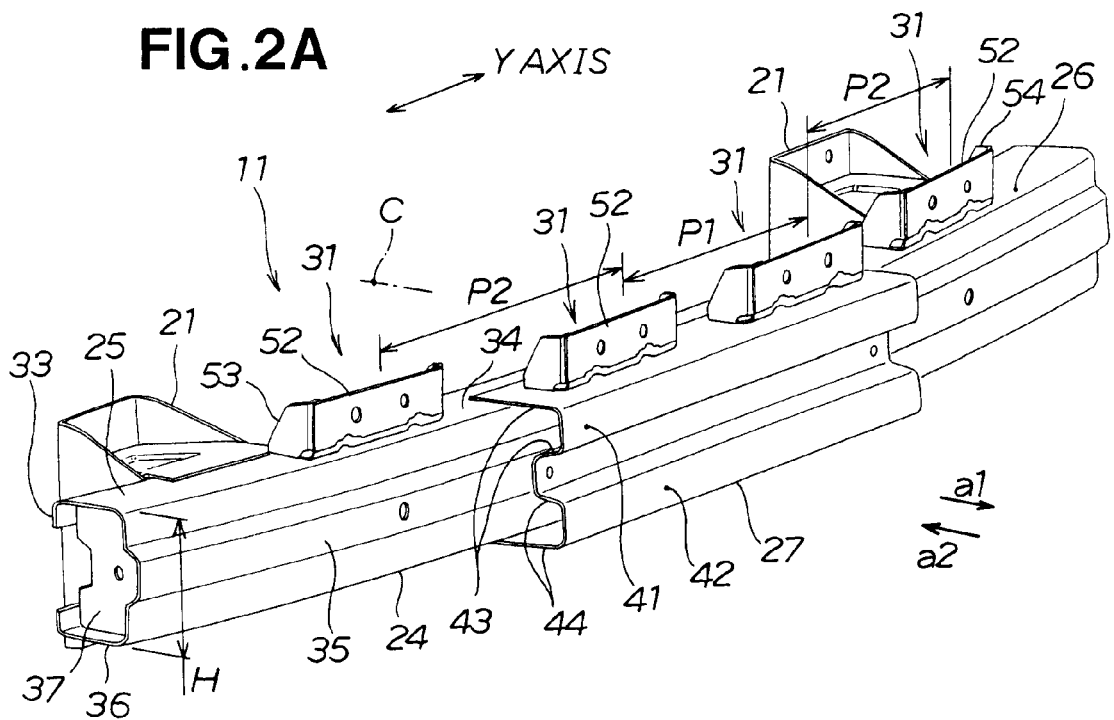
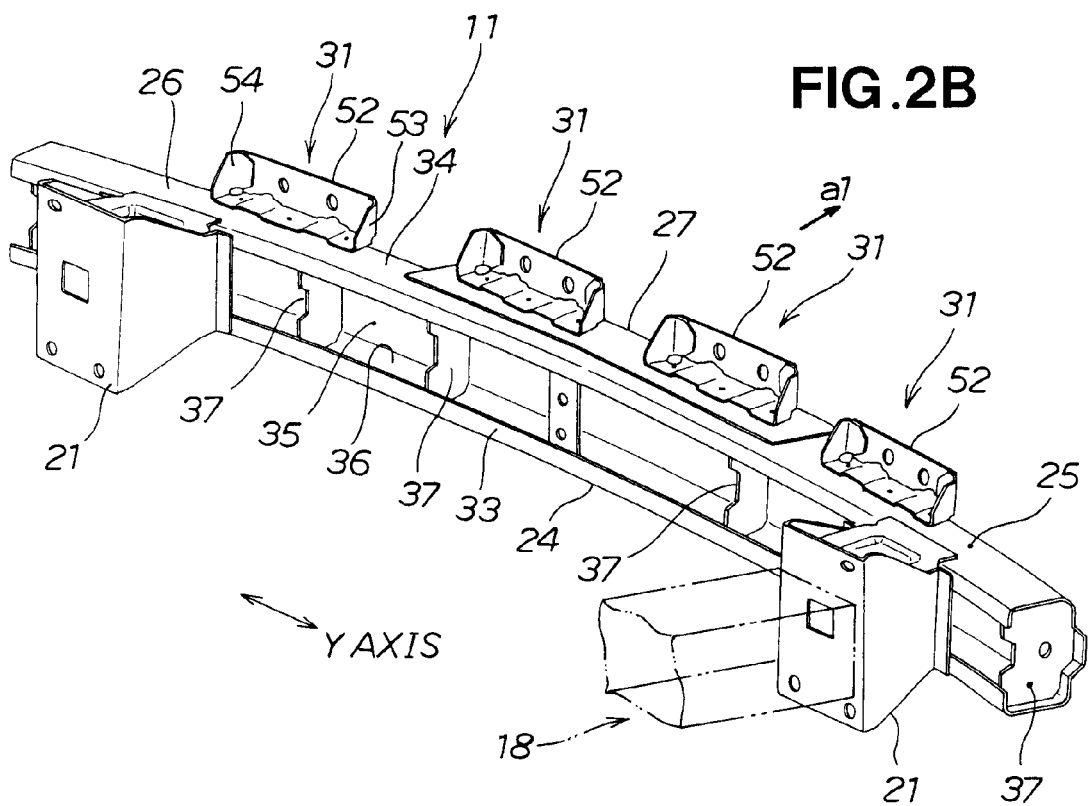

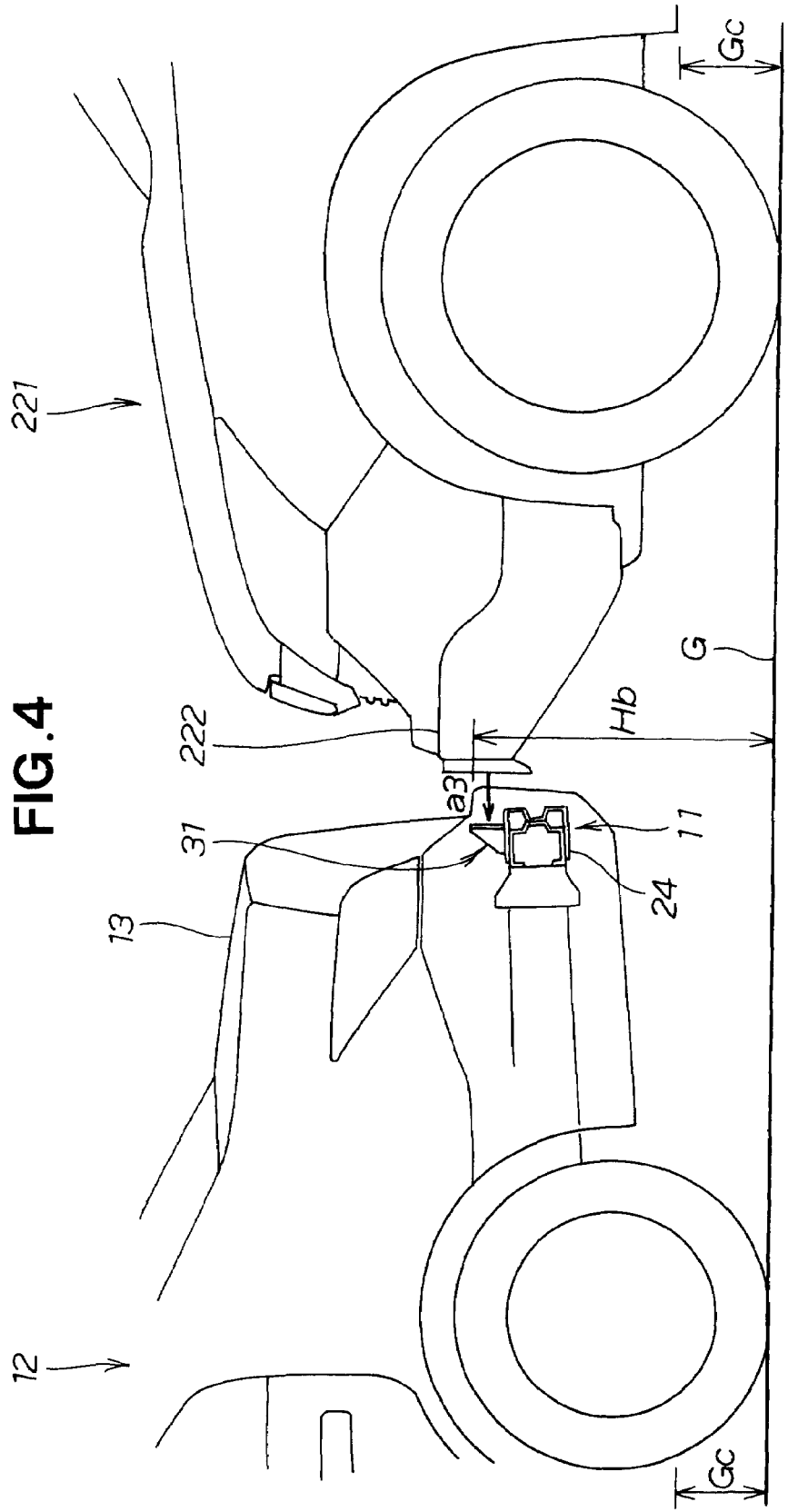

BUMPER BEAM STRUCTURE

FIELD OF THE INVENTION

The present invention relates generally to a bumper for use in a rear section of a vehicle and, more particularly, to an improved bumper beam structure for such a bumper.

BACKGROUND OF THE INVENTION

Automotive vehicles include bumpers at the front and rear ends of the vehicle body, so as to deal with any possible impact applied thereto (see, for example, Japanese Patent Application Laid-Open Publication No. 2005-271734).

FIG. 5 hereof shows an impact absorbing structure disclosed in the 2005-271734 publication. The disclosed impact absorbing structure 201, which is a front bumper, includes front bumper reinforcing members 202 and 203 and crash box 204 that have an upper flange portion 205 and upper edge portion 206, respectively. Thus, the impact absorbing structure 201 has a large height from the ground surface.

Although the disclosed impact absorbing structure 201 can effectively absorb an impact by means of the upper flange portion 205 and upper edge portion 206 as well as the front bumper reinforcing members 202 and 203, it would undesirably have an increased weight due to the provision of the upper flange portion 205 and upper edge portion 206. Further, whereas the provision of the upper flange portion 205 and upper edge portion 206 can enlarge the shock absorbing range upwardly, the disclosed impact absorbing structure 201 can not achieve desired impact absorption.

SUMMARY OF THE INVENTION

In view of the foregoing prior art problems, it is an object of the present invention to provide an improved bumper beam structure for a vehicle which can effectively prevent another vehicle of a higher height from running up onto the vehicle provided with the bumper beam structure.

In order to accomplish the above object, the present invention provides an improved bumper beam structure for a vehicle, which comprises: a beam body to be fixedly supported on left and right frames of a vehicle body; and a height-raising wall provided on an upper portion of the beam body, the height-raising wall including: a bottom wall portion fixed to the upper portion of the beam body; a running-up preventing wall portion extending upwardly from the bottom wall portion so as to prevent a vehicle of a higher height from running up onto the vehicle provided with the bumper beam structure; a first reinforcing wall portion connecting to the respective one ends of the running-up preventing wall portion and the bottom wall portion; and a second reinforcing wall portion connecting to the respective other ends of the running-up preventing wall portion and the bottom wall portion.

With the height-raising wall including the bottom wall portion fixed to the upper portion of the beam body, running-up preventing wall portion extending upwardly from the bottom wall portion and first and second reinforcing wall portions, the weight of the beam body itself can be reduced as compared to a similar beam body where the height of the beam body itself is increased.

Further, because the bumper beam structure of the invention includes the height-raising wall provided on and extend upwardly from the upper portion of the beam body, the height of the height-raising wall and hence the bumper beam structure can almost agree with the height of the front bumper of another vehicle having a higher height, and thus, the front bumper of the higher-height vehicle abuts against the height-raising wall when the higher-height vehicle has collided against the vehicle provided with the inventive bumper beam structure (hereinafter also referred to as "vehicle in question") from behind. In this way, the bumper beam structure of the invention can reliably prevent the higher-height vehicle from running up onto the vehicle in question.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

A preferred embodiment of the present invention will be described in detail below, by way of example only, with reference to the accompanying drawings, in which:

FIGS. 2A and 2B are perspective views illustrating the bumper beam structure;

FIG. 4 is a view illustrating behavior of the bumper beam structure of the invention when a vehicle having a higher height has bumped into the vehicle provided with the inventive bumper beam structure.

DETAILED DESCRIPTION OF THE PREFERRED EMBODIMENTS

Figure 1:
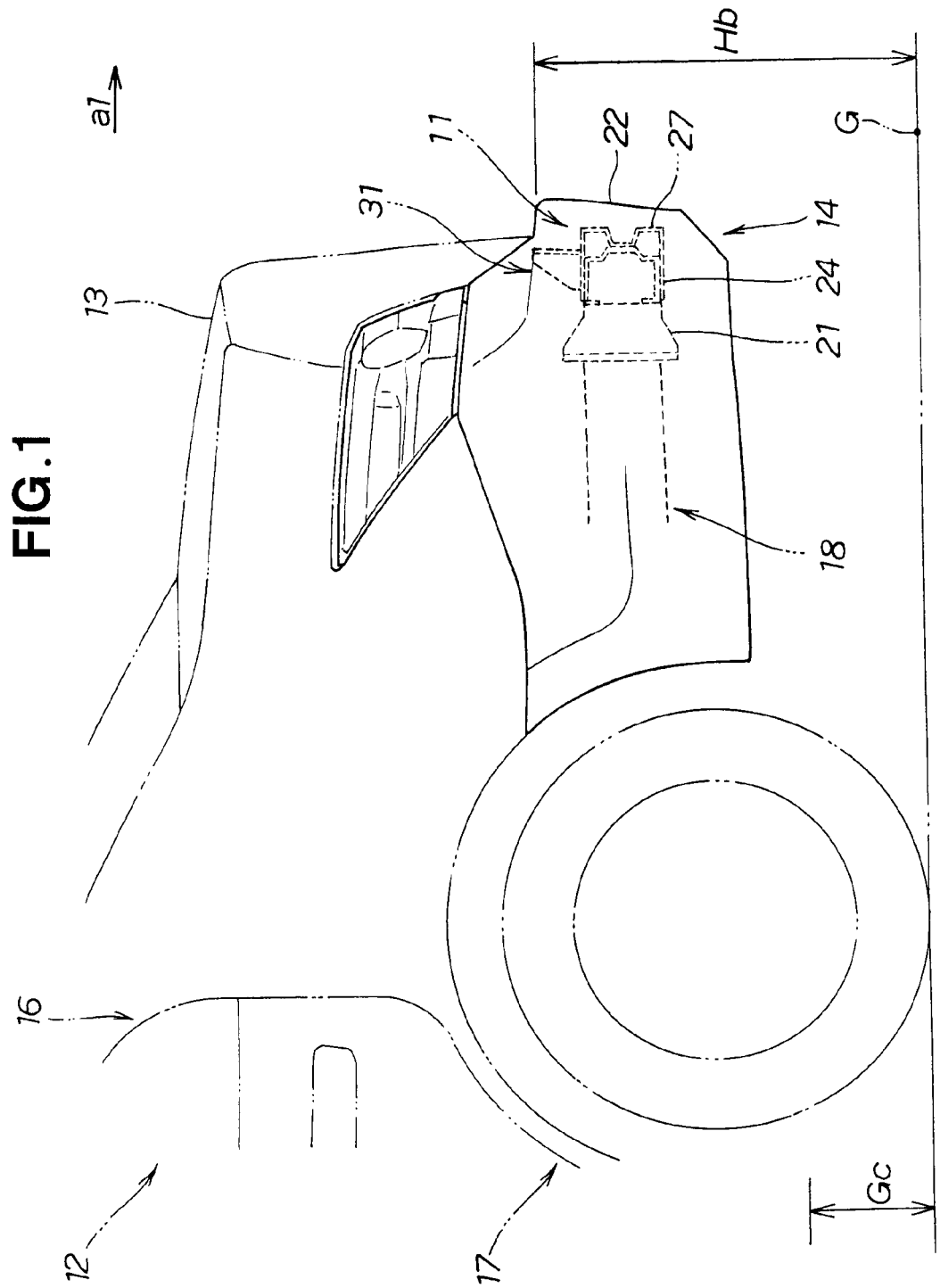
FIG. 1 is a side view of a bumper provided with a bumper beam structure according to an embodiment of the present invention.

Reference is now made to FIG. 1 showing in side elevation a bumper 14 employing a bumper beam structure 11 according to an embodiment of the present invention. The bumper beam structure 11 of the invention is used in a rear bumper 14 mounted on a rear section 13 of a vehicle 12.

The vehicle 12 is, for example, a four-door sedan having an ordinary height, which includes a vehicle body 16 having an underbody 17. The rear bumper 14 is fixed to the rear ends of left and right rear floor frames 18 that are left and right frames of the underbody 17. Here, the "vehicle having an ordinary height" means a vehicle whose lowest height Gc from the ground is in a range of about 130-150 mm.

The bumper 14 includes: left and right brackets 21 fixedly joined to the respective rear ends of the left and right rear floor frames 18; the bumper beam structure 11 having its left and right ends fixed to the left and right brackets 21; and a bumper skin 22. The bumper beam structure 11 has a height Hb from the ground surface G.

FIGS. 2A and 2B are perspective views of the bumper beam structure 11, of which FIG. 2A shows the outside of the bumper beam structure 11 while FIG. 2B shows the inside of the bumper beam structure 11. The bumper beam structure 11 will be described below with combined reference to FIGS. 1, 2A and 2B.

The bumper beam structure 11 includes: a beam body 24 fixed at one end 25 to the left bracket 21 and at the other end 26 to the right bracket 21; a reinforcing auxiliary beam 27 oriented toward the rear (i.e., in a direction of arrow a1) of the vehicle 12 and fixed to a middle region of the beam body 24 intended to withstand a light collision; a plurality of height-raising walls 31 provided at predetermined intervals P1 and P2 and at the height Hb from the ground surface G.

The beam body 24 itself has a height H and is fixed to the brackets 21 with a first side wall portion 33 thereof oriented toward the front of the vehicle 12. The beam body 24 also has an upper portion (e.g., upper wall portion) 34, second side wall portion 35 and lower wall portion 36 sequentially formed integrally with the first side wall portion 33. Ribs 37 are provided on the inner surface of the beam body 24, and the above-mentioned reinforcing auxiliary beam 27 is positioned to overlap a middle region, in a longitudinal or length direction (i.e., Y-axis direction), of the second side wall portion 35.

The reinforcing auxiliary beam 27 has an upper channel-shaped section 41 having a channel cross-sectional shape (as viewed transversely to the longitudinal axis) of the beam 27, and a lower channel-shaped section 42 formed integrally with the upper channel-shaped section 41. The reinforcing auxiliary beam 27 can have an enhanced mechanical strength against an impact applied from the rear (i.e., in a direction of arrow a2), by means of plate portions 43 and 44 of the upper and lower channel-shaped sections 41 and 42 extending horizontally toward the rear (i.e., in the direction of arrow a1).

Figure 3A:
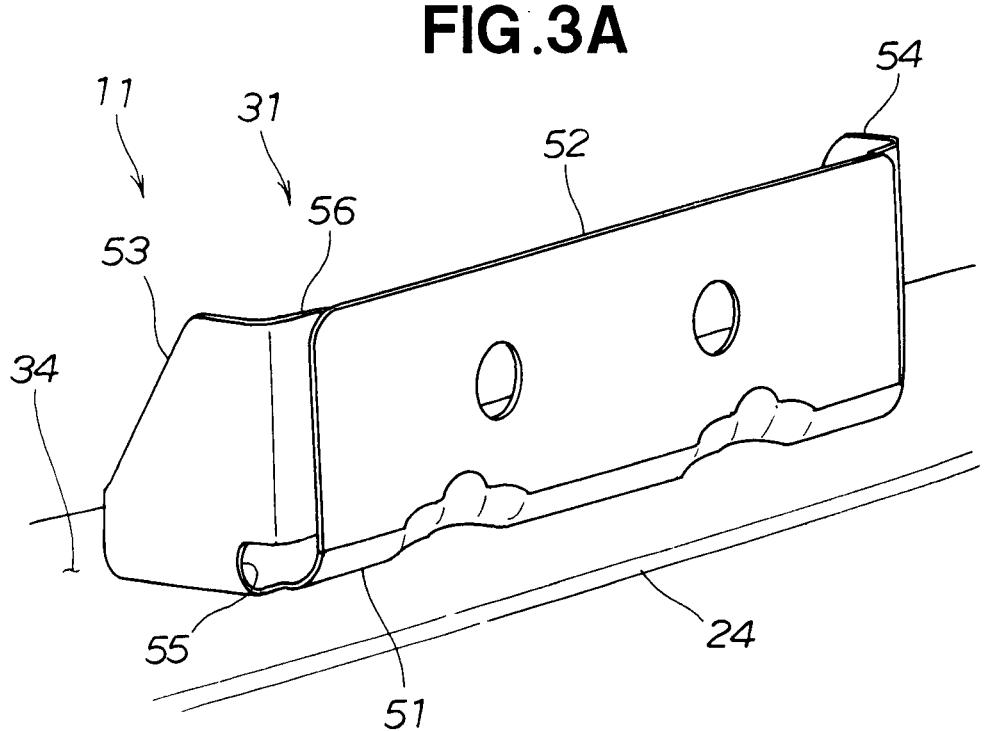
FIGS. 3A and 3B are perspective views illustrating a height-raising wall of the bumper beam structure of the invention.
Figure 3B:
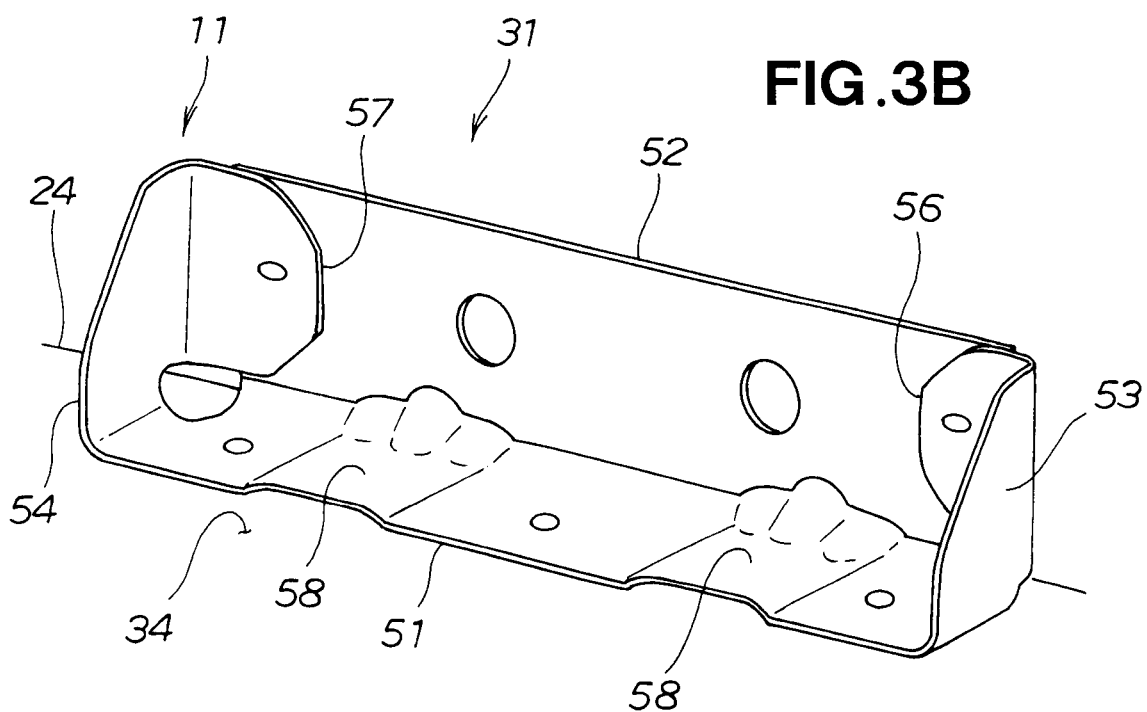
Figure 5:
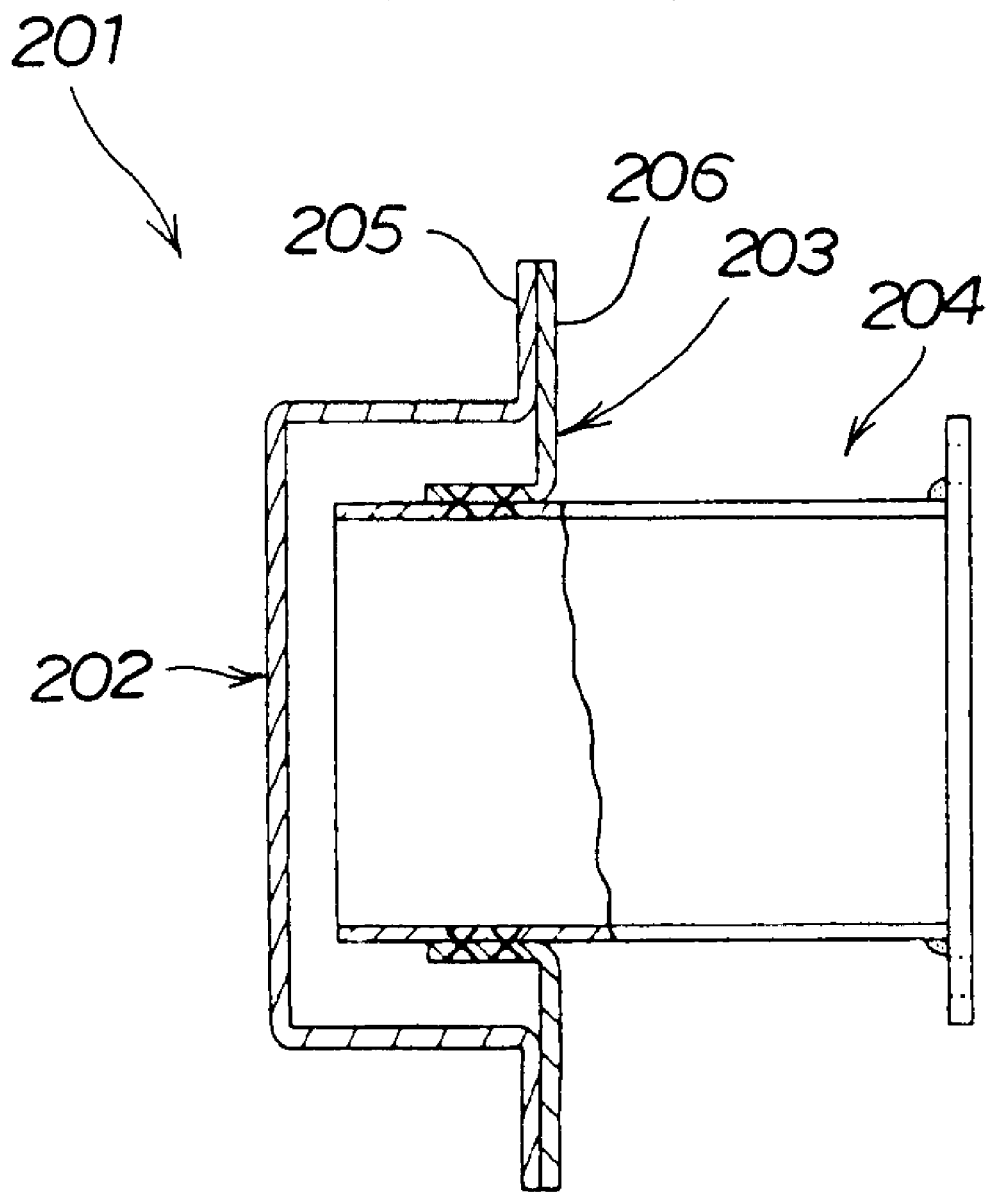
FIG. 5 is a view illustrating a conventionally-known technique.

FIGS. 3A and 3B are perspective views of the height-raising wall 31, of which FIG. 3A shows the outside of the height-raising wall 31 while FIG. 3A shows the inside of the height-raising wall 31.

The height-raising wall 31 includes: a bottom wall portion 51 fixed to the upper portion (upper wall portion) 34 of the beam body 24; a running-up preventing wall portion 52 extending upwardly from the edge of the bottom wall portion 51; and first and second reinforcing wall portions 53 and 54 formed at opposite ends of the running-up preventing wall portion 52. Such height-raising walls 31 are provided at the predetermined intervals P1 and P2 or at desired intervals between the left and right brackets 21 connected to the left and right rear frames 18.

Specifically, some of the height-raising walls 31 are fixed directly to the upper (wall) portion 34 of the beam body 24 while the other (two in the illustrated example) height-raising walls 31 are fixed indirectly to the upper (wall) portion 34 via the reinforcing auxiliary beam 27. Generically speaking, however, it may be the that all of the height-raising walls 31 are fixed to the upper (wall) portion 34 of the beam body 24.

The instant embodiment, where the number of the height-raising walls 31 are provided at the predetermined or desired intervals between the left and right brackets 21, can effectively reduce its overall weight of the bumper beam structure 11 as compared to a similar bumper beam structure where further such height-raising walls are provided outwardly of the left and right brackets; the number of the height-raising walls 31 may be chosen as desired.

More specifically, in each of the height-raising walls 31 which is made by bending or plastic forming of one plate-shaped material, such as a single steel plate, the bottom wall portion 51 to be fixedly joined to the upper wall portion 34 of the beam body 24 is formed into a desired length (in the Y-axis direction), and the running-up preventing wall portion 52 is formed integrally with the bottom wall portion 51 by bending the single plate upwardly from the rear edge of the bottom wall portion 51. It is desirable that the steel plate have a cutout 55 which, when the plate is bent into a final shape, is positioned at a corner formed by the running-up preventing wall portion, the bottom wall portion, and the first reinforcing wall portion or the second reinforcing wall portion Further, in each of the height-raising walls 31, the first reinforcing wall portion 53 is formed integrally with the bottom wall portion 51 by bending the single plate upwardly along the left end edge (i.e., one end edge) of the bottom wall portion 51, and a first overlapping support portion 56 is formed integrally with the first reinforcing wall portion 53 by bending the plate horizontally from the rear edge of the first reinforcing wall portion 53 so as to overlap a left end edge (one end edge) portion of the running-up preventing wall portion 52. The first overlapping support portion 56 is fixedly joined to the running-up preventing wall portion 52.

Furthermore, the second reinforcing wall portion 54 is formed integrally with the bottom wall portion 51 by bending the plate upwardly along the right end (other end) edge of the bottom wall portion 51, and a second overlapping support portion 57 is formed integrally with the second reinforcing wall portion 54 by bending the plate horizontally along the rear edge of the second reinforcing wall portion 54 so as to overlap a right end edge portion of the running-up preventing wall portion 52. The second overlapping support portion 57 is fixedly joined to the running-up preventing wall portion 52. Furthermore, the bottom wall portion 51 has channel-shaped reinforcing beads 58 formed on its opposite end regions, which can achieve an enhanced mechanical strength. Preferably, the running-up preventing wall portions 52 are formed at substantially right angles with the first and second reinforcing wall portions 53 and 54.

In the instant embodiment, where the height-raising walls 31 are each made by plastic forming of one plate-shaped material, they can be manufactured with ease as compared to a case where the bottom wall portion, running-up preventing wall portion and first and second reinforcing wall portions are formed separately from one another and then joined together.

The following paragraphs describe behavior of the bumper beam structure according to the embodiment of the present invention.

By the provision of the height-raising walls 31 each including: the bottom wall portion 51 fixedly joined to the upper (wall) portion 34 of the beam body 24; running-up preventing wall portion 52 extending upwardly from the bottom wall portion 51, first reinforcing wall portion 53 formed integrally with (i.e., integrally connecting to) the respective one end (left end) edges of the running-up preventing wall portion 52 and bottom wall portion 51; and second reinforcing wall portion 54 formed integrally with (i.e., integrally connecting to) the respective other end (right end) edges of the running-up preventing wall portion 52 and bottom wall portion 51 to extend in parallel to the first reinforcing wall portion 53, the beam body 24 itself can be reduced in weight as compared to a similar beam body where the height of the beam body itself is increased to attain the height Hb from the ground surface G, even though the overall height of the bumper beam structure 11 is increased up to the height Hb.

Next, with combined reference to FIGS. 2 and 4, a description will be given about behavior of the bumper beam structure of the invention when another vehicle having a higher height has collided against the vehicle employing the inventive bumper beam structure.

The "vehicle having a higher height" means a vehicle whose lowest height Gc from the ground surface is, for example, in a range of about 185-235 mm, which is higher than that of the vehicle 12 provided with the bumper beams structure 11 (i.e., vehicle in question) having the lowest height Gc of about 130-150 mm.

The bumper beam structure 11 can be advantageously employed in the vehicle 12 having the ordinary height. Namely, when another vehicle 221 (such as a SUV (sport-utility vehicle) or RV (recreational vehicle)) having a higher height has bumped into or collided against the rear section 13 of the vehicle 12 from behind, the bumper beam structure 11 interferes with a front bumper 222 of the higher-height vehicle 221 so that it can prevent the higher-height vehicle 221 from running up onto the vehicle 12 in question.

More specifically, because the bumper beam structure 11 includes the height-raising walls 31 that are provided on and extend upwardly from the upper portion of the beam body 24, the height Hb of the height-raising walls 31 and hence the bumper beam structure 11 can almost agree with the height of the higher-height vehicle 221, and thus, the front bumper 222 of the higher-height vehicle 221 abuts against the height-raising walls 31 as indicated by arrow a3. In this way, the bumper beam structure 11 can prevent the higher-height vehicle 221 from running up onto the vehicle 12 in question.

Further, because the height-raising walls 31 are fixed to the middle region of the beam body 24 via the reinforcing auxiliary beam 27 that is a separate member from the beam body 24, the bumper beam structure 11 can reliably prevent the height-raising walls 31 from being displaced due to plastic deformation of the beam body 24 as compared to a similar bumper beam structure where no such reinforcing beam is employed. As a result, the bumper beam structure 11 can even more reliably prevent the higher-height vehicle 221 from running up onto the vehicle 12 in question.

Furthermore, each of the height-raising walls 31 has the first reinforcing wall portion 53 formed integrally with (i.e., integrally connecting to) the respective one end edges of the running-up preventing wall portion 52 and bottom wall portion 51, and the second reinforcing wall portion 54 formed integrally with (i.e., integrally connecting to) the respective other end edges of the running-up preventing wall portion 52 and bottom wall portion 51 to extend in parallel to the first reinforcing wall portion 53, as set forth above in relation to FIG. 3. Such first and second reinforcing wall portions 53 and 54 can significantly enhance the strength of the running-up preventing wall portion 52 and upper (wall) portion 34 of the beam body 24 against an impact applied from the front bumper 222 of the higher-height vehicle 221.

Whereas the bumper beam structure of the present invention has been described above as employed in the rear bumper of the vehicle, it may also be employed in a front bumper, in which case the bumper beam structure of the present invention can prevent the vehicle in question from getting into under another vehicle having a higher height.

As is apparent from the foregoing description, the bumper beam structure of the present invention is well suited for use in rear bumpers of vehicles having ordinary heights.

What is claimed is:

1. A bumper beam structure for a vehicle, comprising:
a beam body designed to be fixedly supported on left and right frames of a vehicle body; and
a height-raising wall provided on an upper portion of the beam body,
the height-raising wall including:
a bottom wall portion fixed to the upper portion of the beam body;
a running-up preventing wall portion integral with and extending upwardly from a side edge of the bottom wall portion so as to prevent a vehicle of a higher height from running up onto the vehicle provided with the bumper beam structure;
a first reinforcing wall portion connecting to respective first end edges of the running-up preventing wall portion and the bottom wall portion; and
a second reinforcing wall portion connecting to respective second end edges of the running-up preventing wall portion and the bottom wall portion, which are opposite to the respective first end edges of the running-up preventing wall portion and the bottom wall portion, wherein the first reinforcing wall portion is integral with the bottom wall portion and extends contiguously from the first end edge of the bottom wall portion, the first reinforcing wall portion having a first support portion formed integrally therewith and overlapping the first end edge portion of the running-up preventing wall portion, and wherein the second reinforcing wall portion is integral with the bottom wall portion and extends contiguously from the second end edge of the bottom wall portion, the second reinforcing wall portion having a second support portion formed integrally therewith and overlapping the second end edge portion of the running-up preventing wall portion.

2. The bumper beam structure of claim 1, wherein the bottom wall portion has two channel-shaped reinforcing beads formed on opposite end regions thereof which are located adjacent to the first and second end edges of the bottom wall portion.

3. The bumper beam structure of claim 2, wherein the height-raising wall has a cutout at a corner defined by the running-up preventing wall portion, the bottom wall portion, and the first reinforcing wall portion or the second reinforcing wall portion.

4. A bumper beam structure for a vehicle, comprising:
a beam body designed to be fixedly supported on left and right frames of a vehicle body; and
a height-raising wall provided on an upper portion of the beam body,
the height-raising wall including:
a bottom wall portion fixed to the upper portion of the beam body;
a running-up preventing wall portion integral with and extending upwardly from a side edge of the bottom wall portion so as to prevent a vehicle of a higher height from running up onto the vehicle provided with the bumper beam structure;
a first reinforcing wall portion connecting to respective first end edges of the running-up preventing wall portion and the bottom wall portion; and
a second reinforcing wall portion connecting to respective second end edges of the running-up preventing wall portion and the bottom wall portion, which are opposite to the respective first end edges of the running-up preventing wall portion and the bottom wall portion, wherein the bottom wall portion has at least one channel-shaped reinforcing bead.

5. The bumper beam structure of claim 4, wherein the bottom wall portion has two channel-shaped reinforcing beads formed on opposite end regions thereof which are located adjacent to the first and second end edges of the bottom wall portion.

* * * * *